United States Patent
Gorzynski et al.

(10) Patent No.: US 8,432,431 B2
(45) Date of Patent: Apr. 30, 2013

(54) COMPOSITING VIDEO STREAMS

(75) Inventors: Mark E Gorzynski, Corvallis, OR (US);
Michael D. Darocher, Albany, OR (US);
Bradley L. Allen, Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 268 days.

(21) Appl. No.: 12/936,303

(22) PCT Filed: Jun. 30, 2009

(86) PCT No.: PCT/US2009/049308
§ 371 (c)(1),
(2), (4) Date: Oct. 4, 2010

(87) PCT Pub. No.: WO2010/002925
PCT Pub. Date: Jan. 7, 2010

(65) Prior Publication Data
US 2011/0025819 A1 Feb. 3, 2011

Related U.S. Application Data

(60) Provisional application No. 61/076,941, filed on Jun. 30, 2008.

(51) Int. Cl.
*H04N 7/14* (2006.01)
(52) U.S. Cl.
USPC .................. 348/14.07; 348/14.08; 348/14.12
(58) Field of Classification Search .... 348/14.01–14.16; 709/204; 370/260–261
See application file for complete search history.

(56) References Cited

U.S. PATENT DOCUMENTS

| | | |
|---|---|---|
| 6,195,116 B1 | 2/2001 | Lee |
| 2004/0257433 A1 | 12/2004 | Lia |
| 2005/0122392 A1 | 6/2005 | Johansen et al. |
| 2006/0066717 A1* | 3/2006 | Miceli ........................ 348/14.09 |
| 2006/0125921 A1 | 6/2006 | Foote |
| 2007/0279483 A1* | 12/2007 | Beers et al. ................ 348/14.08 |
| 2008/0002962 A1 | 1/2008 | Ito et al. |
| 2008/0030621 A1 | 2/2008 | Ciudad et al. |
| 2008/0136899 A1* | 6/2008 | Eisenberg et al. ......... 348/14.09 |
| 2008/0143818 A1* | 6/2008 | Ferren et al. ............... 348/14.08 |
| 2009/0040288 A1* | 2/2009 | Larson ....................... 348/14.09 |

FOREIGN PATENT DOCUMENTS

| | | |
|---|---|---|
| JP | 1995-236128 | 9/1995 |
| JP | 1998-271477 | 10/1998 |
| JP | 2000-165831 | 6/2000 |

(Continued)

OTHER PUBLICATIONS

The International Search Report and the Written Opinion of the International Searching Authority for International Application No. PCT/US2009/049308 dated Jan. 14, 2010, pp. 11.
SIPO, First Office Action dated Jun. 27, 2012, in related counterpart case, Chinese Pat. App. No. 200980125233.1, filed Dec. 30, 2010.

(Continued)

*Primary Examiner* — Melur Ramakrishnaiah

(57) ABSTRACT

Methods and apparatus for compositing multiple video streams onto a background image having at least one object while keeping at least one of a proper perspective, order, and substantial alignment to the object of the multiple video streams based on the rules of a common layout. The background is defined as a meeting space that fills in gaps between the multiple video streams with appropriate structure of the object. The background creates the context of the meeting space.

20 Claims, 18 Drawing Sheets

FOREIGN PATENT DOCUMENTS

| | | |
|---|---|---|
| JP | 2003-333572 | 11/2003 |
| JP | 2005-333552 | 12/2005 |
| JP | 2007-150918 | 6/2007 |
| KR | 100238072 | 1/2000 |
| WO | WO-9847291 | 10/1998 |
| WO | WO-2007/005108 | 1/2007 |

OTHER PUBLICATIONS

EPO, Extended Search Report dated Oct. 19, 2012, counterpart App No. 08732756.5 filed Sep. 21, 2010.

* cited by examiner

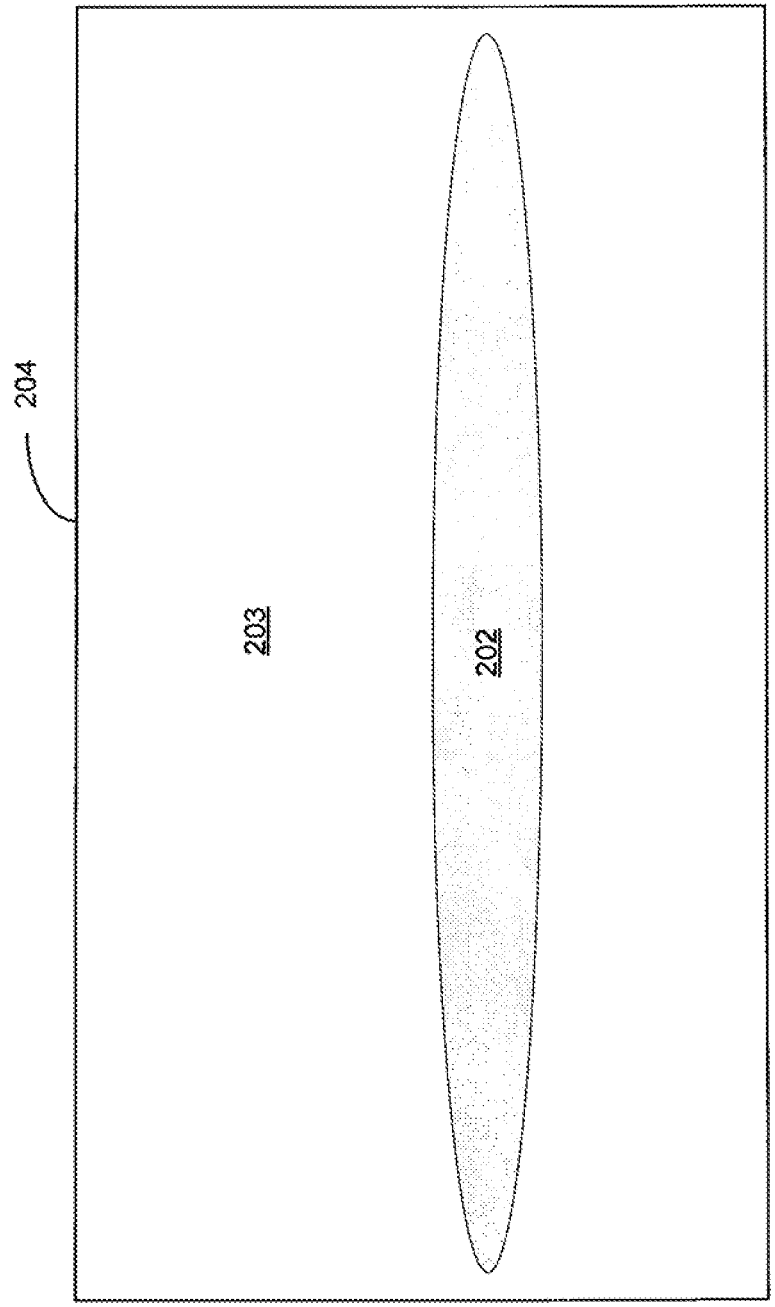

COMPOSITING VIDEO STREAMS

CROSS REFERENCE TO RELATED APPLICATIONS

This application claims the benefit of U.S. Provisional Application No. 61/076,941, filed Jun. 30, 2008. Furthermore, this application is related to International Application No. PCT/US2008/058006, filed Mar. 24, 2008, which claims the benefit of U.S. Provisional Application No. 61/037,321, filed Mar. 17, 2008, both of which are incorporated by reference herein.

BACKGROUND

Video conferencing is an established method of simulated face-to-face collaboration between remotely located participants. A video image of a remote environment is broadcast onto a local display, allowing a local user to see and talk to one or more remotely located participants.

Social interaction during face-to-face collaboration is an important part of the way people work. There is a need to allow people to have effective social interaction in a simulated face-to-face meeting over distance. Key aspects of this are nonverbal communication between members of the group and a sense of being co-present in the same location even though some participants are at a remote location and only seen via video. Many systems have been developed that try to enable this. However, key problems have prevented them from being successful or widely used.

For instance, social nonverbal communication refers to the multiple ways humans gather information about what others are thinking and feeling and communicating using body language, facial expressions, position in a group and the activities performed. Many researchers from cognitive to perceptual scientists have studied the means by which humans have the ability to look at a group of people and see their activities and expressions and from these, develop powerful feelings of what the people in the group are thinking and feeling. The environment is a key part of enabling people to "read" other people. Many video conferencing systems fail to take this environment factor into account in their implementation. Therefore, there is a need to preserve these cognitive and perceptual clues during video conferencing sessions.

For the reasons stated above, and for other reasons that will become apparent to those skilled in the art upon reading and understanding the present specification, there is a need in the art for alternative video conferencing methods.

BRIEF DESCRIPTION OF THE DRAWINGS

FIG. 2A is a representation of an example background image for use with various embodiments.

FIGS. 5A-5D depict correction of video streams and compositing of corrected video steams onto a background in accordance with another embodiment.

DETAILED DESCRIPTION

Figure 1A:
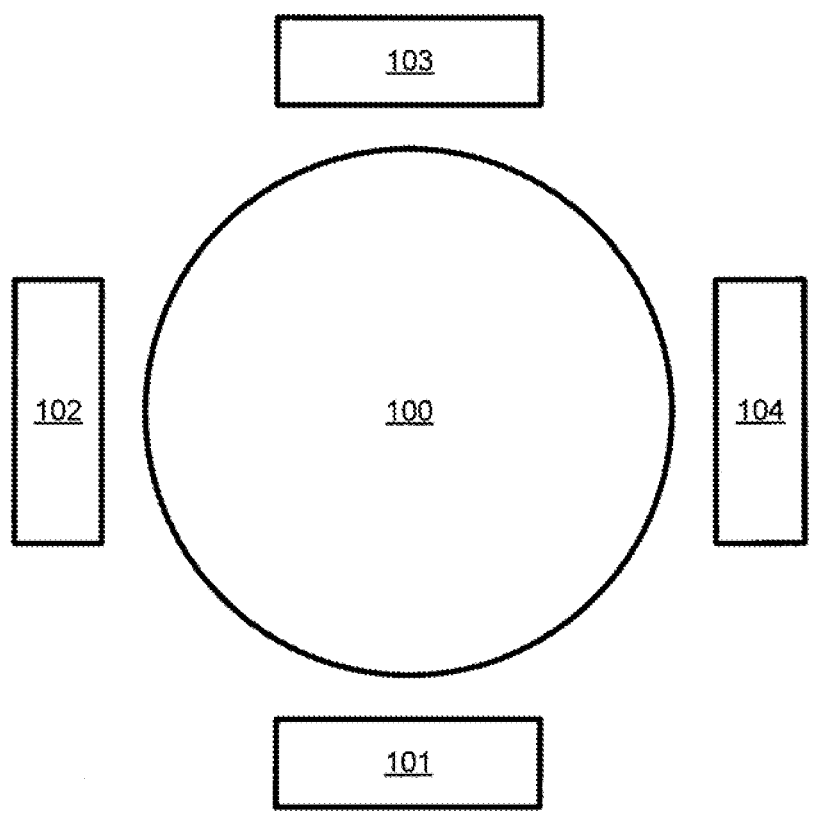
FIGS. 1A-1C are maps of common meeting topology layouts for use with various embodiments.

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

Various embodiments described herein facilitate a unified meeting space view for improving social collaboration. Such embodiments enable a local endpoint to create a view of multiple remote endpoints by blending their video streams into a meeting space that provides context for the social communication. The meeting space is coordinated between participants to encourage accurate social communication.

Various terms are used within this description to describe various embodiments of the invention. For the purposes of helping to clarify the meaning of the terms, the following definitions are presented and are expanded upon when used within the specification.

An "endpoint" is defined as any videoconferencing location. In this specification, that can be a participant in an event.

An "event" is meant to be understood broadly as including any designated time and virtual meeting place providing systems a framework to exchange information. An event allows at least one node to transmit and receive media information. According to one exemplary embodiment, the event exists separate and distinct from all nodes participating in collaboration. Further, an event may exist while nodes are exchanging information and may also exist while no nodes are participating.

A "meeting topology" is a specific arrangement of meeting attendees/locations as combined via a service into a logical, unified 'virtual' space. Relative locations and spatial relationships of participants (room/table shape, and locations within), common meeting background elements (table, wall, etc.), nominal view distances, and view angles are all dependent on this arrangement. For example, a first location can be 'placed' to the right of a second location, and to the left of a third location, and directly across from a fourth location to make a combined virtual space of a circular table arrangement (see FIG. 1A). A location can be a meeting endpoint or a sub-set of a meeting endpoint.

A "virtual meeting layout service" is a central software service provided on a network that accomplishes the above topologies formation in the computer implemented process of forming and executing the meeting and changes to the meeting.

A "multipoint video meeting" is a video conference meeting where more than two locations joined into a single meeting.

"Source-side compositing" refers to video image combinations and manipulations from the camera-side, created and sent from an endpoint with its outgoing video stream to provide an appropriate view of that endpoint location as determined via rules for a meeting topology.

"Receive-side compositing" refers to video image combinations and manipulations that are created at the receiving endpoint to provide a specific view of incoming streams that is determined via rules for a meeting topology.

A "meeting background" is an element or combination of visual elements based on objects or spatial references, used to perceptually anchor video participants into an implied meeting topology.

"Virtual Collaboration" is defined as a meeting where at least some of the participants of a meeting are at remote sites and are interconnected via video and audio media streams over a network.

"Blended Space" is defined such that it combines a local physical environment of one set of attendees with respective apparent spaces of other sets of attendees that are transmitted from two or more remote environments to create a geometrically consistent shared space for the collaboration event that maintains natural collaboration cues such as eye contact and directional gaze awareness. That is, the other attendees' remote environments are represented in the local physical environment of the local attendees in a fashion that is geometrically consistent with the local physical environment. By maintaining the geometric consistency, the resulting blended space extends the local physical environment naturally and consistently with the way the remote environments may be similarly extended with their own blended spaces. In this manner, each blended space for each set of attendees experiences natural collaboration cues such as sufficient eye contact and sufficient directional awareness of where other event attendees are looking at (e.g. gaze awareness). Each blended space thus provides dimensional consistency for all sets of attendees an apparent shared space that is sufficiently similar for all sets of attendees whether in local or remote locations.

A "central management system" is defined as a host computer including any number of hardware, software, firmware components, or any combination thereof. As used in the present specification, the central management system may be a part of or hosted by one or more computing devices including, but in no way limited to, servers, personal computers, personal digital assistants, or any other processor containing apparatus such as codes, switches, and routers, to name a few. Various subsystems and modules of the central management system may perform differing functions or roles and together remain a single unit, program, device, or system.

A "local management system" is defined as is defined as a client computer including any number of hardware, software, firmware components, or any combination thereof. As used in the present specification, the local management system may be a part of or hosted by one or more computing devices including, but in no way limited to, servers, personal computers, personal digital assistants, or any other processor containing apparatus such as codes, switches, and routers, to name a few. Various subsystems and modules of the local management system may perform differing functions or roles and together remain a single unit, program, device, or system.

A "common layout" is a spatial arrangement of meeting participants, defined by its topology, that is shared between the joined video conference endpoints. This common layout can be thought of as meeting space 'themes' like meeting room, auditorium, conference space, etc.

A "local layout" is the specific view that any location will have of the video conference meeting, from their perspective as appropriate for their position within the common layout and meeting topology.

An "event management client" is an originator of an event management request. It may be a human driven event such as with a user interface or a machine request from another host or client, such as a concierge system running an event management application. Hosts or clients at various endpoints may change their manner of participation in an event. Accordingly, the "event management client," whether human or machine driven, allows for requesting to start and/or update events in the virtual collaboration event.

In-person collaborative meetings typically take place in some kind of environment suitable for the type of meeting. The environment may be described by a meeting topology which defines a common layout theme implemented by the various endpoints to create a virtual meeting space. A small meeting might be virtualized in a simple room around a small table. Larger formal meetings might be virtualized in a conference room. Presentations to an audience might be virtualized in an auditorium. The environment is important because it provides a continuous geometrically consistent space where a participant can see other people who are participants in the virtual meeting space. In such a meeting topology, the participant can see positions of other people relative to each other and to themselves that preserves the geometric consistency of the meeting topology. Further, they can also see objects within the environment. These simple activities enable social nonverbal communication and a sense of closeness to other people which are the primary reasons for gathering together. It is desired that such relationships be maintained independent of the respective local event environments, be they a full conference room, a modular system, or a personal terminal, just to name a few examples.

For instance, one needs to know where other people are and whom they are looking at. One needs to see other people in correct size and shape and to see what objects in the environment they may be referring to. In conventional virtual collaboration where participants of a meeting are at remote sites, key non-verbal factors of how some people read other people are generally not available. With conventional multipoint video conferencing, a collection of video windows are placed on a data-like display. That is, participants are seen as inhabiting separate video windows on a display and are not integrated into a single geometrically consistent environment. This separate video window display means that one cannot accurately interpret other participant's facial expressions when they are directed at different participants in the meeting group. One may see them but can not be sure whom the other participants are looking at. The other participants in a meeting are typically displayed at different sizes and magnifications and at different heights and locations, respectively, depending on where a particular video window is placed on the data-like display. These artificially segmented video windows strengthen a feeling of separateness between the meeting participants and thus do not create a sense of a geometrically consistent shared or "blended" space where the participants are gathered.

For various embodiments, a meeting space is partly defined by means of a background image. This background may contain objects like tables or stages common to a meeting environment. The background image may further have information and items displayed such as lighting, chairs, walls and places for information like names, collaboration data and places, and time-of-day. This background image may defined by pixels, e.g., a fixed set of image data, or it may be defined logically, e.g., defining elements by size, placement, color, shading, etc. Video streams from a network are brought in to a local site and composited correctly into this meeting topology environment. Alternatively, the video streams are composited fully or partially at a host site and then further composited or directly displayed for viewing. The methods described herein include coordination between information in this virtual meeting space and information in the various video streams. For example, if the meeting is around a table, the meeting space may show that table in the background image and the video streams might have correctly sized table sections as well for aligning with the background table. In some cases, remote video streams may have trouble creating valid streams which meets the meeting topology requirements. The methods described herein may further provide for "adding information to," or "removing information from," such video streams that lack the required proper structure.

In various embodiments, information in video streams is coordinated via a "virtual meeting layout service" to create a compelling multipoint video meeting environment that preserves social non-verbal communication. Methods of coordinating the meeting space are established via rules for compositing correct information at the source-side endpoint and/or a receive-side endpoint.

Most conventional multipoint video conference applications separate participant display video as a desktop window amongst others on a display. These participant windows are arranged in some uncoordinated or predetermined fashion but there has been no effort made to blend the video into a geometrically consistent environment desktop image theme.

For example, one conventional video conferencing application can create an arrangement of windows on the desktop for various types of information. For instance, a video stream of a single participant may be displayed in a single window at the upper left of a video display. A panorama image from one room may be displayed in another window at the bottom of the video display, etc. Accordingly, video streams from different sites are displayed separately.

In other examples, other conventional video conferencing applications can create a perspective method of arranging multipoint video streams. The desktop is made into a black background where video streams are placed in windows shown in perspective to create an illusion that the video is part of a curved or faceted space. However, such perspective methods do not address several problems. There is no relationship between the size of the video and the relative dimensions of the desktop. Video windows are displayed in a generic size rather than a size appropriate for the content of the stream. These perspective methods have one background and are not able to change the background depending on meeting type. The background and arrangement is the same for all meetings and there is no coordination of the location of participants so a person's relative position in a group is not maintained across all participants. Therefore, they are not geometrically consistent nor do they share a common blended space.

The methods and apparatus described herein address problems with these existing systems by creating proper meeting backgrounds coordinated to the specific meeting type and the geometric and relative positioning of participants via compositing participant video streams onto these backgrounds in a way that preserves scale and shape and position relative to other video streams from other endpoints and meeting elements, like tables.

Figure 1B:
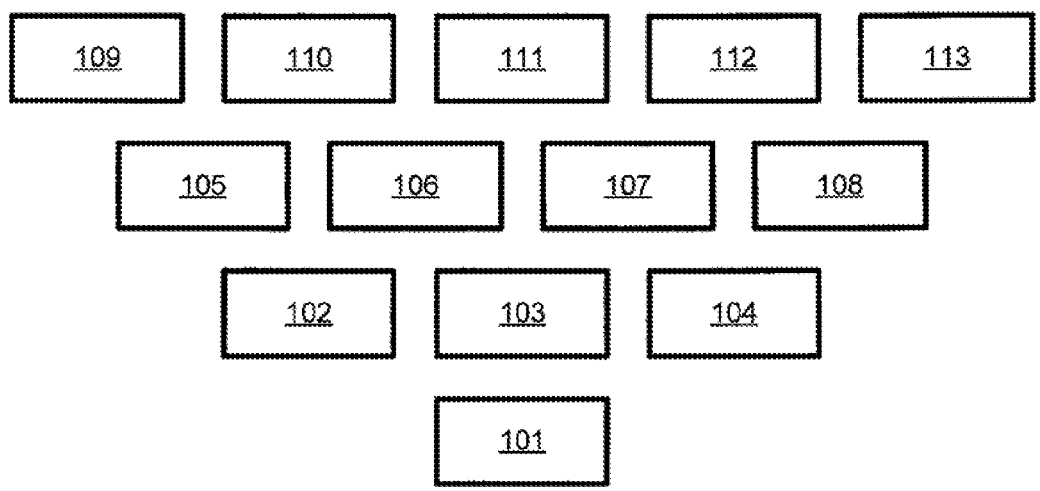
Figure 1C:
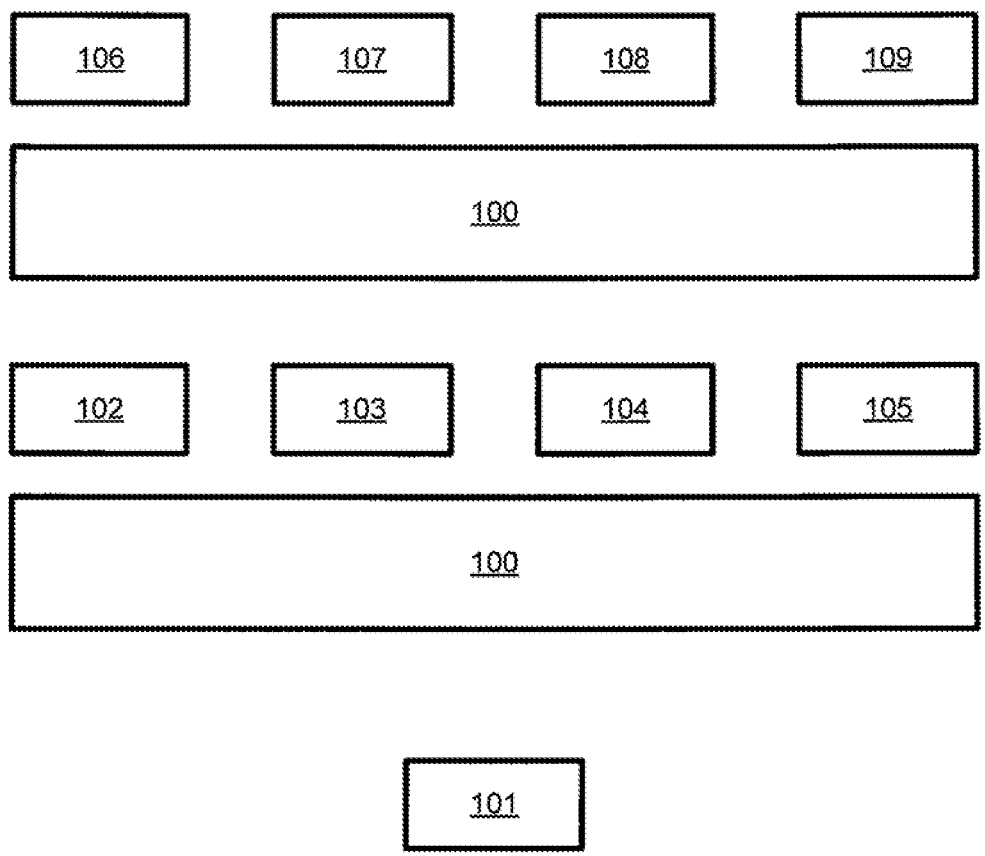

A meeting topology is defined via a geometrically consistent participant location with a common layout for the environment that is shared consistently amongst the various endpoints within the virtual meeting. This common layout includes the relative orientation of seating positions and endpoints in the layout. This common layout can be illustrated as an explicit map as depicted in FIGS. 1A-1C. Alternatively, the common layout could be defined by a mathematical relationship such as in commonly assigned U.S. patent application Ser. No. 11/559,348, filed Nov. 13, 2006 and entitled "Blended Space for Aligning Video Streams" is incorporated by reference herein. FIG. 1A shows a circular layout of endpoints, assigning relative positions around a table 100. In this common layout, endpoint 101 would have endpoint 102 on its left, endpoint 103 directly across and endpoint 104 on its right. Consistent with the common layout, endpoint 101 might then display images from endpoints 102, 103 and 104 from left to right. Note that this layout is not restricted by actual physical locations of the various endpoints, but is concerned with their relative placement within a virtual meeting space. Similarly, endpoint 102 might then display images from endpoints 103, 104 and 101 from left to right, and so on for the remaining endpoints. For such a meeting type, each endpoint might display the images from other endpoints composited onto a background depicting a table, as described in more detail herein.

FIG. 1B shows an auditorium common layout of endpoints, assigning relative positions as if seated in an auditorium. In such a common layout, an "instructor" endpoint 101 might display images from all remaining endpoints 102-113 composited onto a background depicting the stadium seating of an auditorium, while each "student" endpoint 102-113 might display only the image from endpoint 101 composited onto a background depicting a stage. A background depicting an auditorium may be depicted to give the appearance of depth with geometric consistency, such that endpoints toward the back of the auditorium, e.g., 109-113, would use a smaller scale than endpoints toward the front of the auditorium, e.g., endpoints 102-104.

FIG. 1C shows a classroom common layout of endpoints, assigning relative positions as if seated in a classroom setting containing two tables 100. In this example common layout, an "instructor" endpoint 101 might display images from all remaining endpoints 102-109 composited onto a background depicting two tables for participant seating. The background may further be depicted in perspective with geometric consistency, such that the table in the rear would appear smaller. Other common layouts simulating physical orientation of participant locations may be used and the disclosure is not limited by any particular layout. It is noted that the common layout may be a single definition, e.g., maintained by a hosting service on a host server, or it may be two or more related layouts having the same overall common meeting topology definition, e.g., maintained by client members at different endpoints connected within a peer-to-peer network.

Regardless of the number of endpoints or the chosen meeting type, the various embodiments make use of a common layout of a meeting topology common to each endpoint. The common layout will define the respective geometries of the video streams and the relative placement of participants in a composited image for each endpoint and the respective background image to be used for each endpoint according to the meeting topology in order to construct the overall virtual meeting space. However, as noted above, e.g., with respect to an auditorium meeting type, a background image need not be the same for each endpoint, but is merely defined for each endpoint according to the common layout in the meeting topology.

For one embodiment, the common layout is defined at a central management system, e.g., a hosting service, coordinating the video conference among the endpoints. The local management system of each endpoint coordinates with the central management system to determine at least a) what type of meeting is being held, b) what video stream is desired from that local endpoint, and c) what video streams will be received from remote endpoints, and d) what background will be used. This background image may have information and items displayed such as lighting, tables, chairs, walls and places for information like names, collaboration data and places, and time-of-day. As such, each background image may be different for each endpoint but remain consistent for the common layout within the meeting toplogy. For another embodiment, one of the endpoints includes the function of the central management system in addition to being a video source and endpoint client.

For one embodiment, the local client endpoints provide video streams (source-side compositing) consistent with geometric and content rules established by the common layout of the meeting topology. For example, geometric rules include but are not limited to field of capture, zoom magnification, camera angle, and aspect ratio. Content rules may include rules that deal with items like tables and chairs and backgrounds of proper color for the meeting topology established by the common layout. Alternatively, in receive-side compositing, the video streams may be edited by the central management system or by the remote receiving endpoints to meet the rules of the common layout.

In cases where the local client endpoint cannot create a valid stream for the meeting topology rules directly from the image captured with its camera, the local client endpoint also may have the opportunity to edit the video stream. This video stream editing can include scaling to the desired image dimensions, cropping to remove undesired elements, or padding to fill the image to the desired dimensions, including the possibility of adding the background.

Following creation of the desired video streams for the meeting topology rules from the participating endpoints, the video streams of each local endpoint are composited onto a respective meeting space background for the desired video streams appropriate to the meeting topology rules. The meeting space background fills in gaps between images with appropriate structure and creates the context for the meeting space.

For some embodiments, the field of capture, i.e., the geometry of the captured image, for a local endpoint is defined by the common layout in the meeting topology rules. For example, the common layout may define that each local endpoint has a field of capture to place four seating locations in the image. Creating video streams from standard fields of capture can be accomplished physically via Pan-Tilt-Zoom-Focus controls on cameras or digitally via digital cropping or other manipulation from larger images. Multiple fields can be captured from a single local space endpoint and used as separate modules within the common layout. Common layouts can account for local endpoints with multiple fields by treating them as separate local endpoints within the meeting topology, for example.

Each local endpoint participating in a virtual video conference would have its own view of the event. For some embodiments, each local endpoint will have a different view, i.e., local layout, corresponding to its positioning as defined in the common layout within the meeting topology.

The local layout is a system for establishing locations for displaying video streams that conform to these rules. The following various embodiments will be described using the examples of a meeting space around a circular table. The extension to other meeting space geometries such as an auditorium or classroom will be apparent from such examples.

FIG. 2A is a representation of an example background image 204 for use with various embodiments of the circular table meeting topology. The background image 204 includes a table image 202 in the foreground against a backdrop 203. The background image 204 might be used to depict a virtual meeting space corresponding to the common layout of FIG. 1A, for example. As shown in FIG. 2A, the table image 202 is an abstract representation of a table top in perspective. However, the table image 202 could take on a more realistic look, e.g., incorporating legs, texture, color, etc. Similarly, the backdrop 203 may also take on a more realistic look by incorporating other architectural elements, such as windows, doors, chairs, wall seams, etc.

Figure 2B:
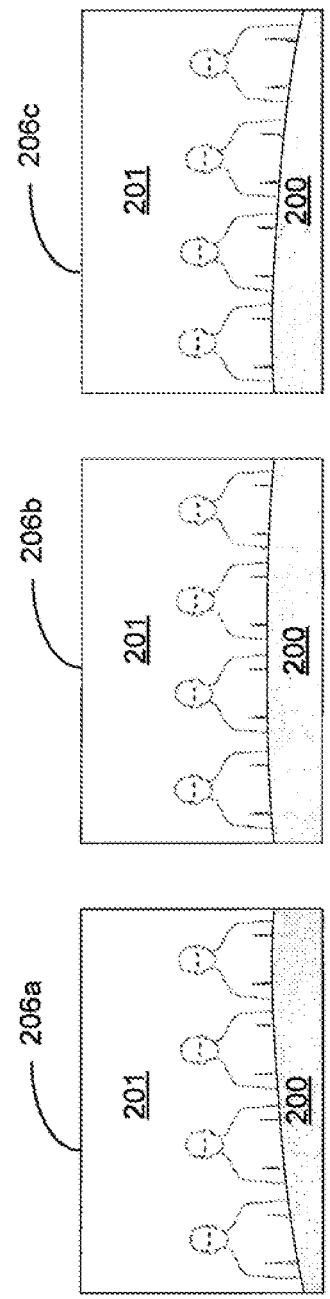
FIG. 2B is a representation of video streams to be received from one or more endpoints for compositing into the background image of FIG. 2A.

FIG. 2B is a representation of video streams 206a-206c to be received from one or more endpoints for compositing into the background image of FIG. 2A. For example, the video streams 206a-206c may be received from three endpoints, such as endpoints 102, 103 and 104 of FIG. 1A. Alternatively, the video streams 206a-206c may be received from a single endpoint having three cameras to capture three different views of the same endpoint. Each video stream 206 is captured or edited to conform to geometric rules of the common layout, e.g., the common layout circular table meeting topology of FIG. 1A in this example. For the various embodiments using post-capture editing of the video streams to conform to the rules of the common layout, the video streams 206 may be edited at the source endpoint, by the central management system or by the receiving endpoint. For the example embodiment, the common layout may define geometric rules, such as the magnification of the video streams 206 rotation, perspective, their aspect ratio, and placement of the edges of tables 200 within each stream, as some examples. The common layout may further define aesthetic content rules, such as color of the tables 200 to match the color of the table image 202 and color of the backdrop 201 to match the color of the backdrop 203 of the background image 204, for example.

Figure 2C:
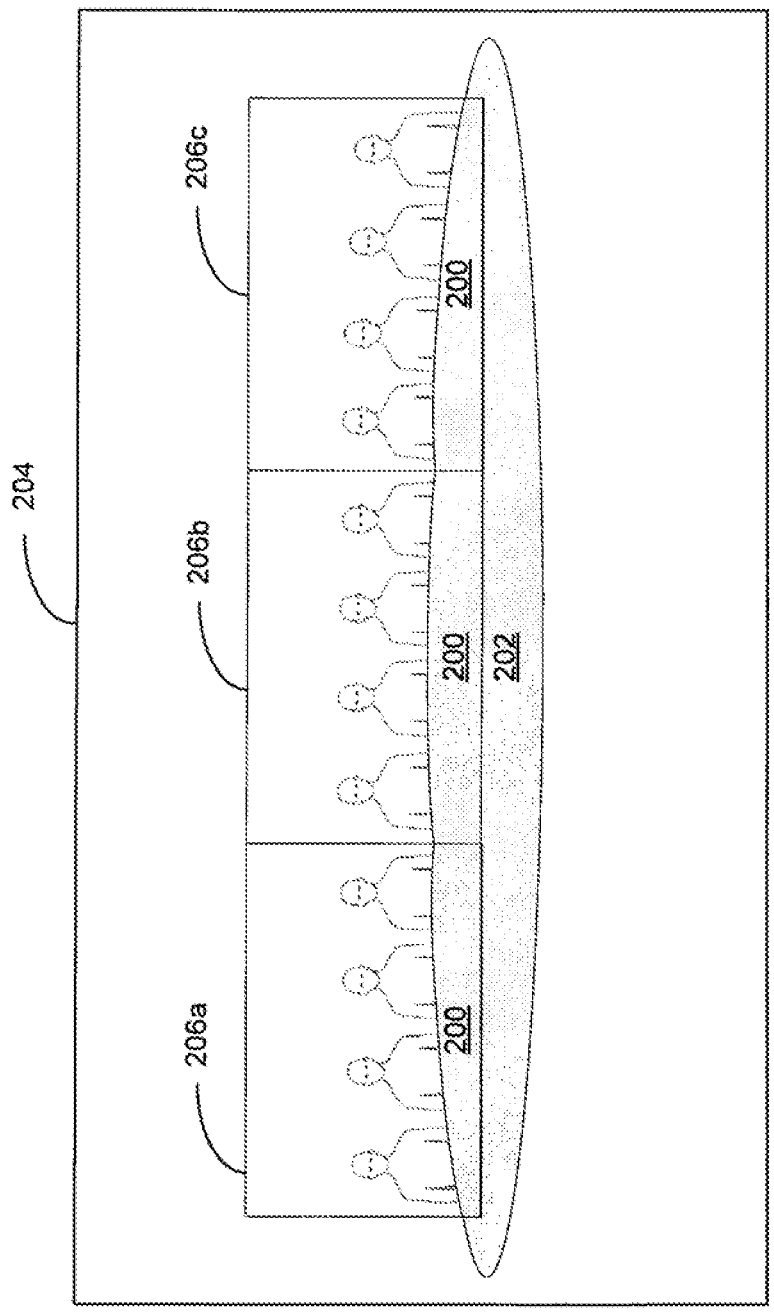
FIG. 2C is a representation of the compositing of video streams onto the background image of FIG. 2A in accordance with an embodiment.

FIG. 2C is a representation of the compositing of the video streams 206a-206c onto the background image 204. As shown in FIG. 2C, the edges of tables 200, whose placement within each video stream 206 was defined by the common layout, are positioned to align with edges of the table image 202 to give the impression that the participants of the video streams 206 are seated at a single table, i.e., to create a virtual meeting space where a participant of the local endpoint viewing the composited background image could perceive the remote participants as seated across a table from the local participant. By defining the geometry of the background image 204, the desired geometry of the received video streams 206 will be defined by their placement within the background image 204. For example, by knowing the geometry of the table image 202, the geometry of any video stream 206 to be composited to appear that its participants are seated behind the table image 202 can be defined such that the edges of the tables 200 will properly align with the edge of the table image 202.

Figure 2D:
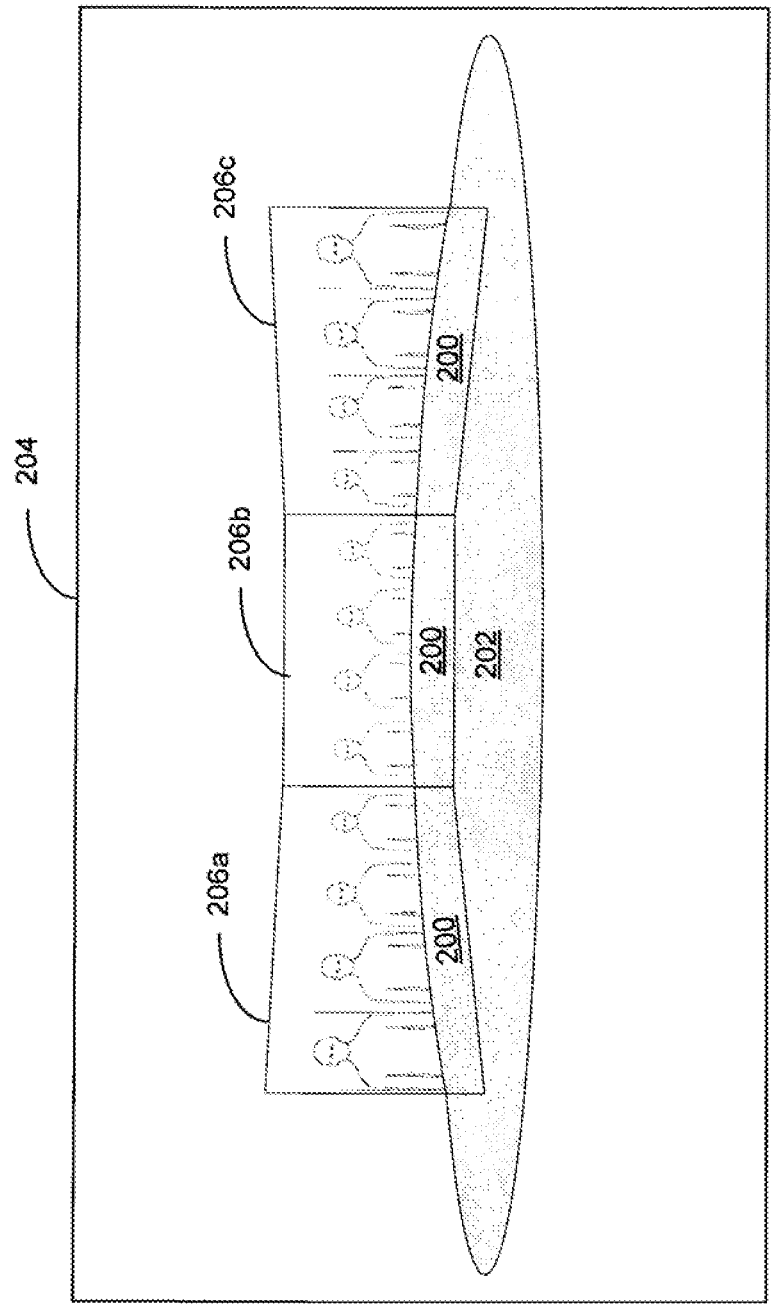
FIG. 2D is a representation of the compositing of video streams onto the background image of FIG. 2A in accordance with another embodiment.

While the video streams of FIG. 2B were shown to have differing geometries dependent upon their placement within the composited background image of FIG. 2C, to maintain the relative positioning of endpoints for each receiving endpoint might involve creating multiple video streams from each endpoint. For example, referring to the common layout of FIG. 1A, the video stream from endpoint 102 would have the geometry of video stream 206a when viewed from endpoint 101, video stream 206b when viewed from endpoint 104, and video stream 206c when viewed from endpoint 103. While this composited image could be achieved by using multiple cameras, each configured to capture the appropriate video stream geometry, or through non-rectangular cropping of a single video stream, an alternative may be to display the video streams 206 in perspective to align the edges of their tables 200 with the edges of the table image 202. FIG. 2D is a representation of a composited background image where video streams 206a-206c each conform to a single geometry, e.g., the geometry of video stream 206b, but video streams 206a and 206c are displayed in perspective to align the edges of their tables 200 with the edges of the table image 202.

Figure 3A:
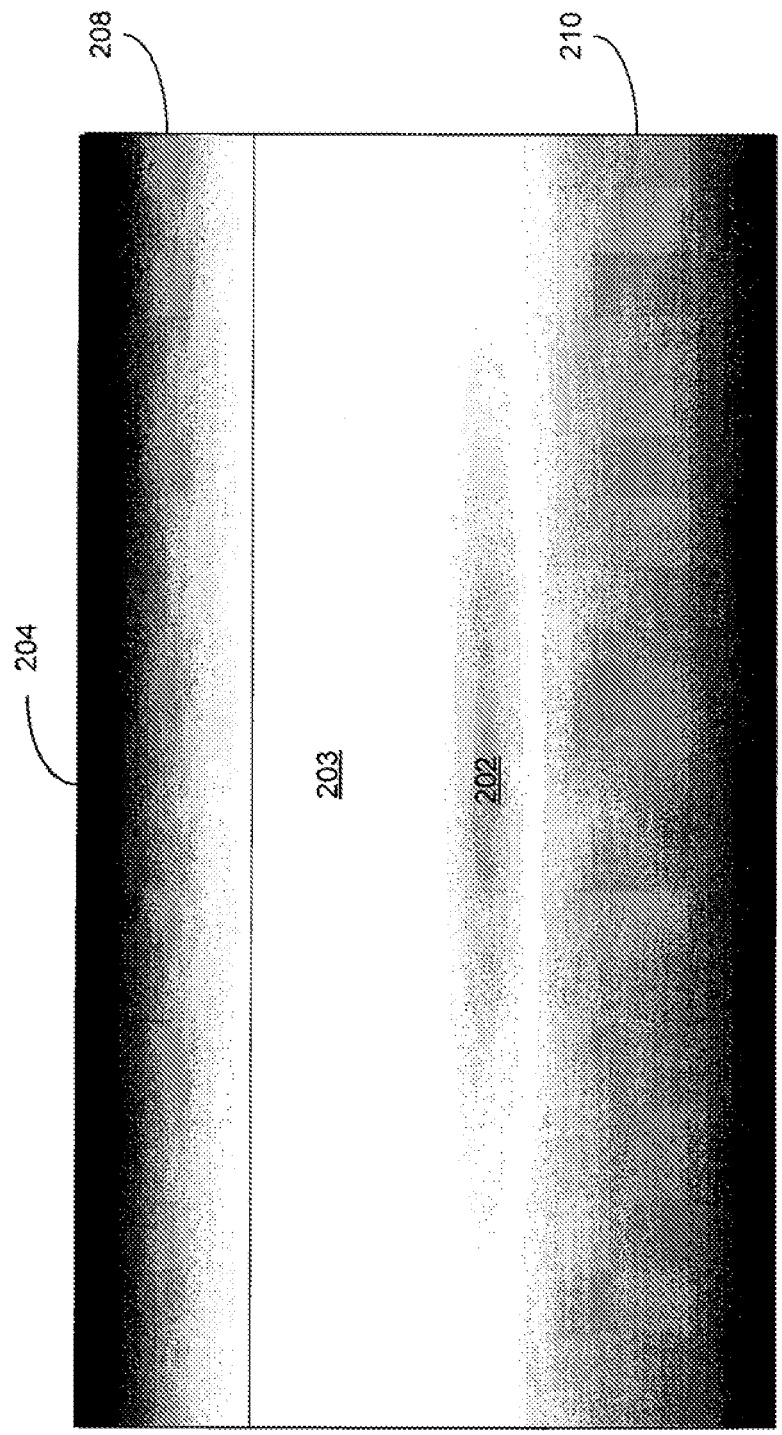
FIG. 3A is a representation of another background image for use with various embodiments.
Figure 3B:
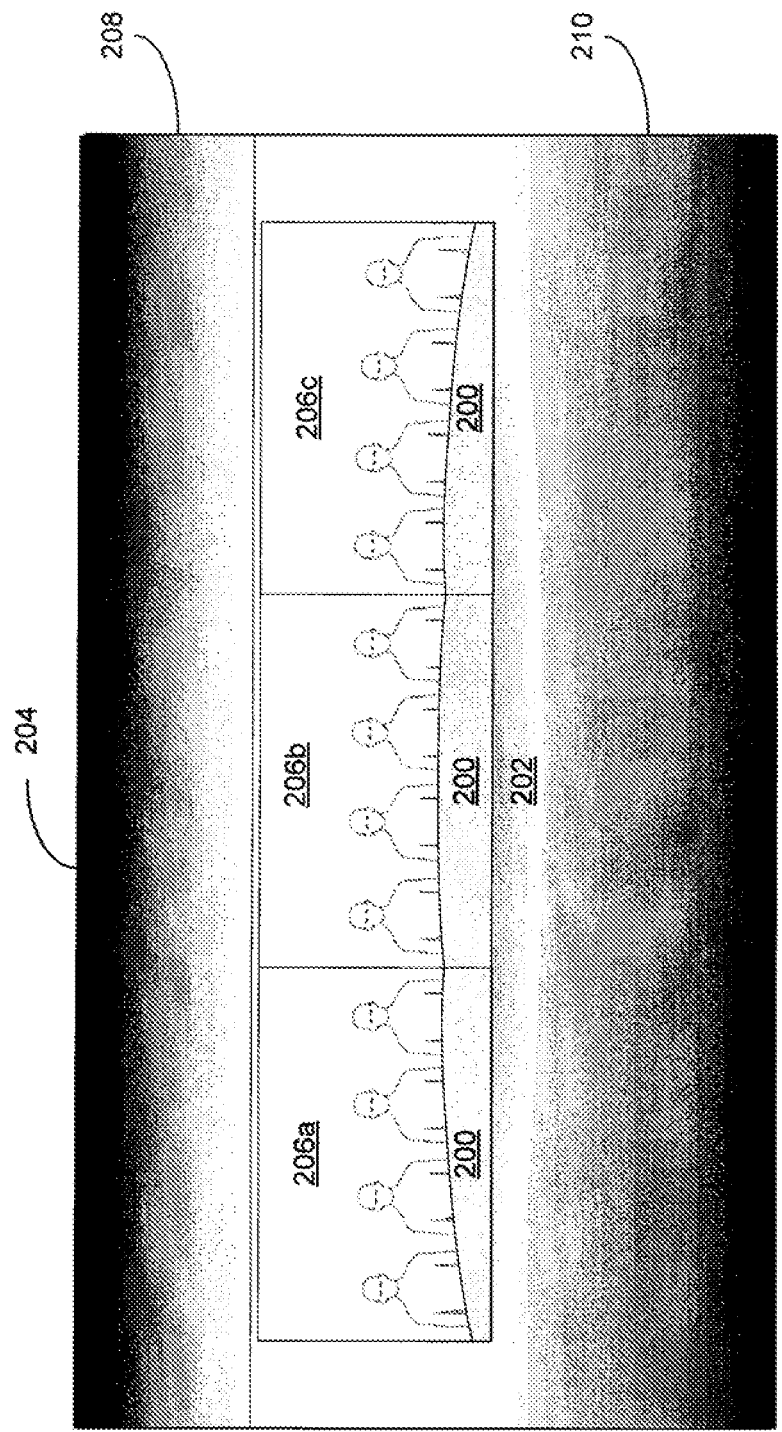
FIG. 3B is a representation of the compositing of video streams onto the background image of FIG. 3A in accordance with an embodiment.

Note that while the edges of the tables 200 are substantially aligned with the edges of the table image 202 of FIG. 2C or 2D, there is no requirement of absolute alignment. The intention is merely to facilitate the perception of a single meeting space. To reduce any distraction from absolute alignment, the edges of the table image 202 may be softened as a rule. FIG. 3A is a representation of a background image 204 showing the table image 202 having softened edges. The background image 204 further includes elements 208 and 210 at the upper and lower portions of the background image 204, respectively. The elements 208 and 210, shown to fade from darker to lighter as a rule, may serve to focus attention of the video streams of the endpoints. FIG. 3B shows the video streams 206a-206c composited onto the background image 204 of FIG. 3A.

Figure 4A:
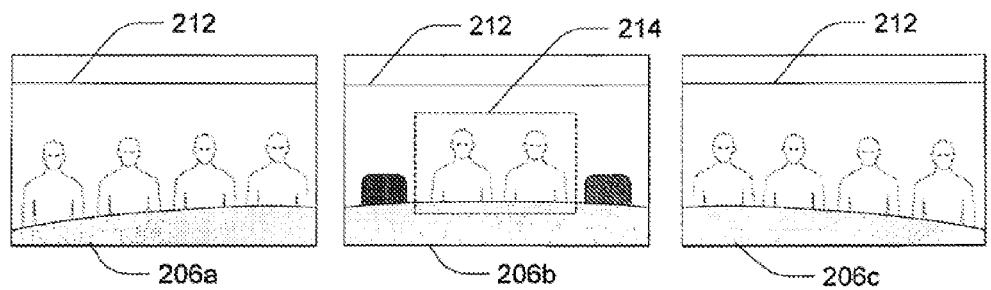
FIGS. 4A-4C depict correction of video streams and compositing of corrected video steams onto a background in accordance with an embodiment.
Figure 4B:
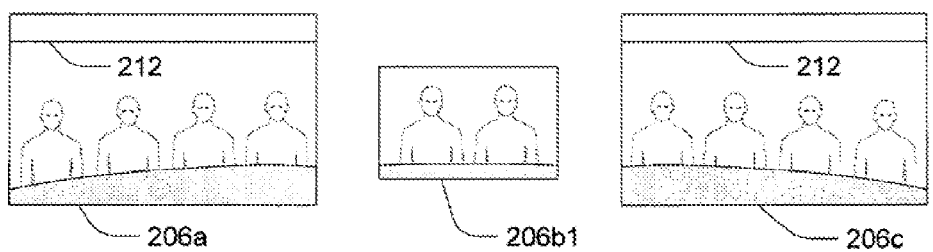

While FIGS. 2C, 2D and 3B depict video streams 206 having the same image dimensions, captured video streams from some endpoints may not be capable of providing the correct dimensions, or there may be undesirable elements contained within the content of the video stream. FIG. 4A is a representation of video streams 206a-206c received from one or more endpoints for compositing within a background image in accordance with an embodiment. The video stream 206b depicted in FIG. 4A is shown to have only two participants, leaving empty chairs in the image as undesired content. The video streams 206a-206c are further depicted to include a wall seam 212 within their images. To remove the empty chairs from the video stream 206b, the image might be cropped as depicted by dashed line 214. Cropping of video stream 206b might produce video stream 206b1 as shown in FIG. 4B. Note that the cropping of video stream 206b not only removes the empty chairs, but also the wall seam 212 in this example. It is noted that the video stream 206b1 may also represent the video stream of an endpoint that is not capable of producing an image of the desired dimensions. For example, for an endpoint configured for two participants instead of four participants, its field of capture may not extend far enough to capture its two participants at the same scale as a field of capture of an endpoint configured for four participants.

Figure 4C:
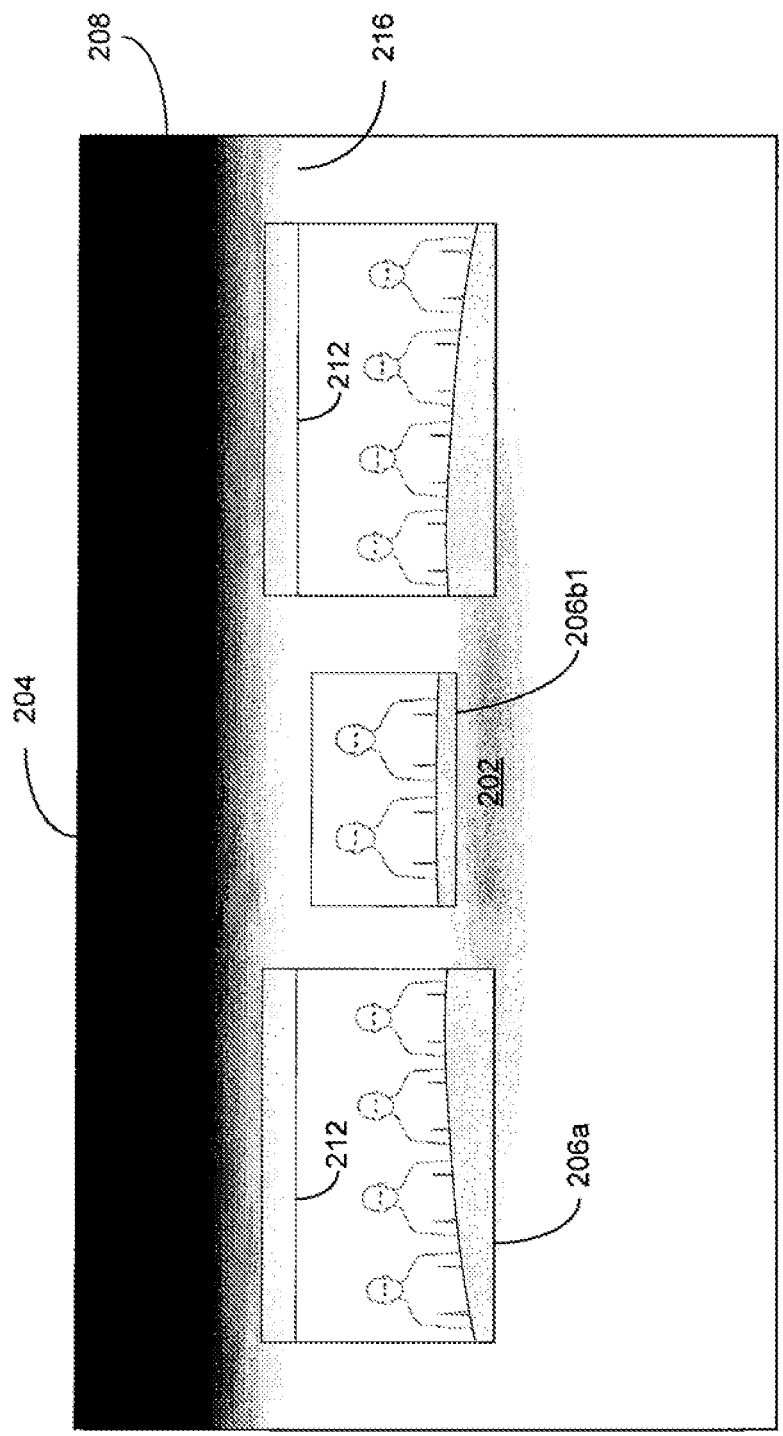

The video streams 206a, 206b1 and 206c of FIG. 4B may be composited onto a background image 204 as-is, such as depicted in FIG. 4C. As shown in FIG. 4C, the background element 208 has an edge 216 aligned with the wall seams 212 of video streams 206a and 206c. Such alignment carries the feel of this architectural artifact, i.e., the wall seams 212, through the composited image. However, the video stream 206b1 lacks capture of the wall seam 212 from its endpoint. If this wall seam is desired, matting or other manipulation may be employed to add desired elements from a cropped video stream, or simply to replace desired elements to a video stream that is geometrically smaller than desired.

Figure 5A:
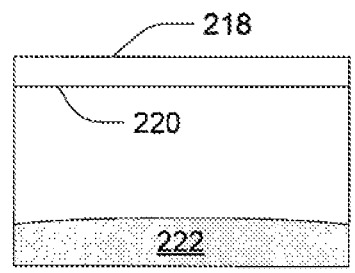
Figure 5B:
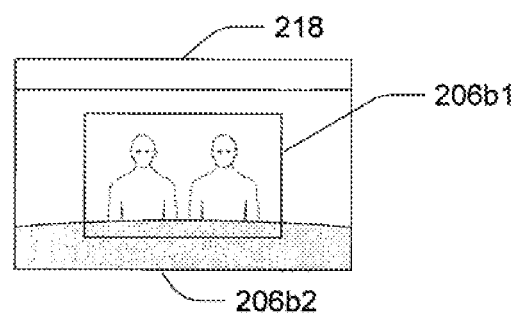
Figure 5C:
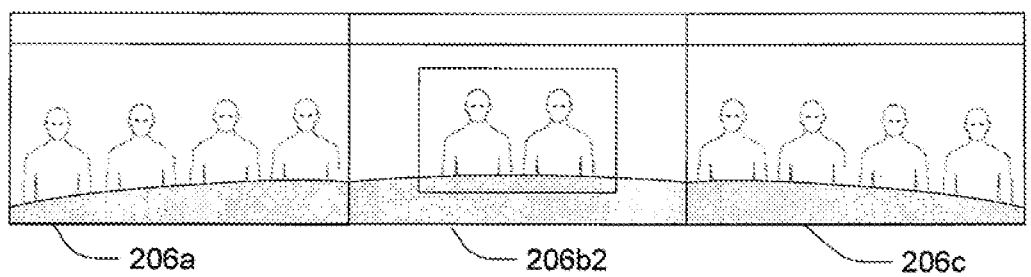
Figure 5C:
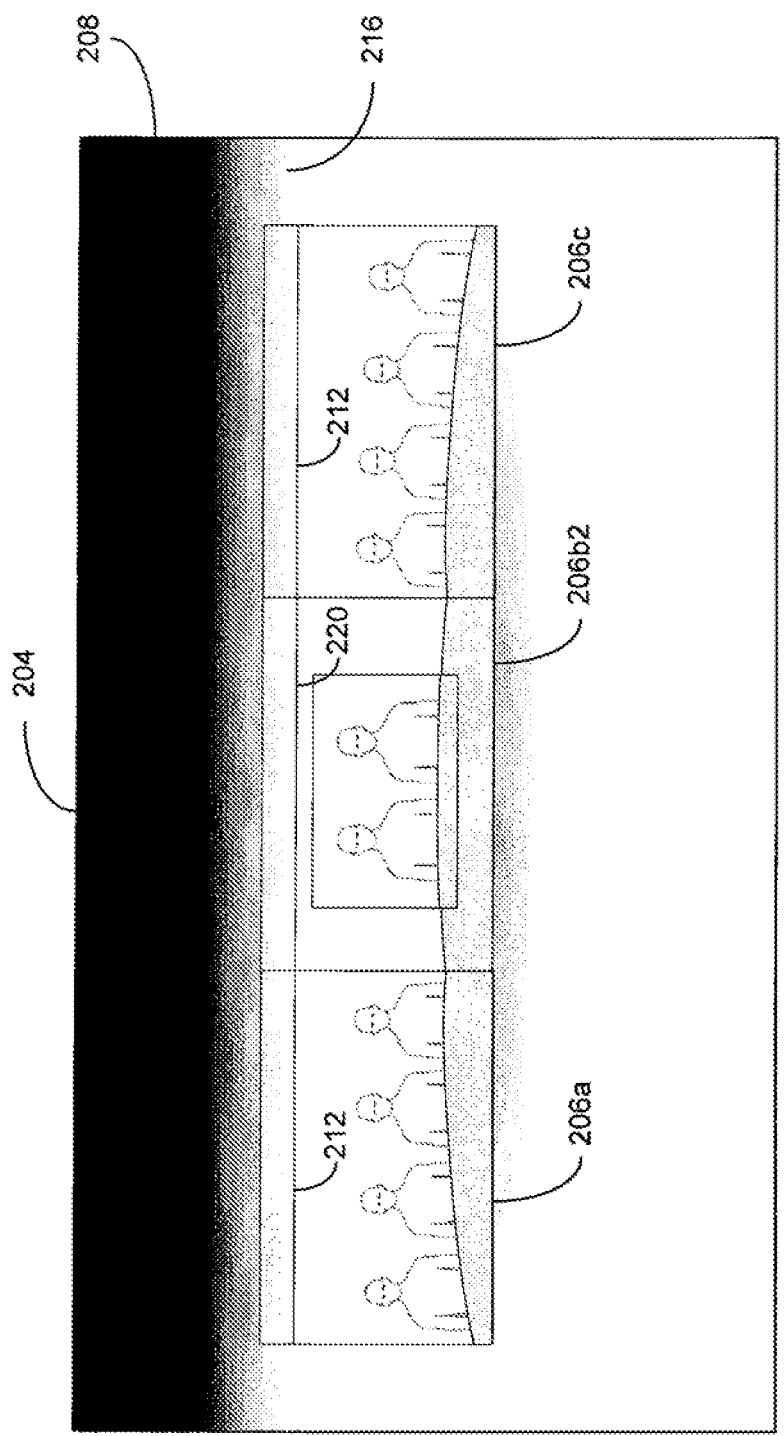

FIG. 5A is a representation of a mat 218 having the desired geometry as defined by a common layout, e.g., the common layout of FIG. 1A in this example. The mat 218 also incorporates a wall seam image 220 and a table image 222. The mat 218 may be darkened and blurred (not depicted in FIG. 5A, but see discussion with respect to FIG. 3B) to make it less important visually than the video stream to be corrected and not distract the viewers. FIG. 5B is a representation of a source-side composite video stream 206b2, where the video stream 206b1 is composited onto the mat 218 at the endpoint creating the video stream. In this manner, the video streams 206a, 206b2 and 206c of FIG. 5C can provide the perception of a continuous geometric space. FIG. 5D is a representation of a composite image showing video streams 206a, 206b2 and 206c of FIG. 5C composited onto a background image 204. Unlike the composite image of FIG. 4C, each video stream 206 now maintains a consistent look with wall seams 212 of video streams 206a and 206c, and wall seam image 220 of video stream 206b2, aligning with an edge 216 of background element 208.

Figure 6A:
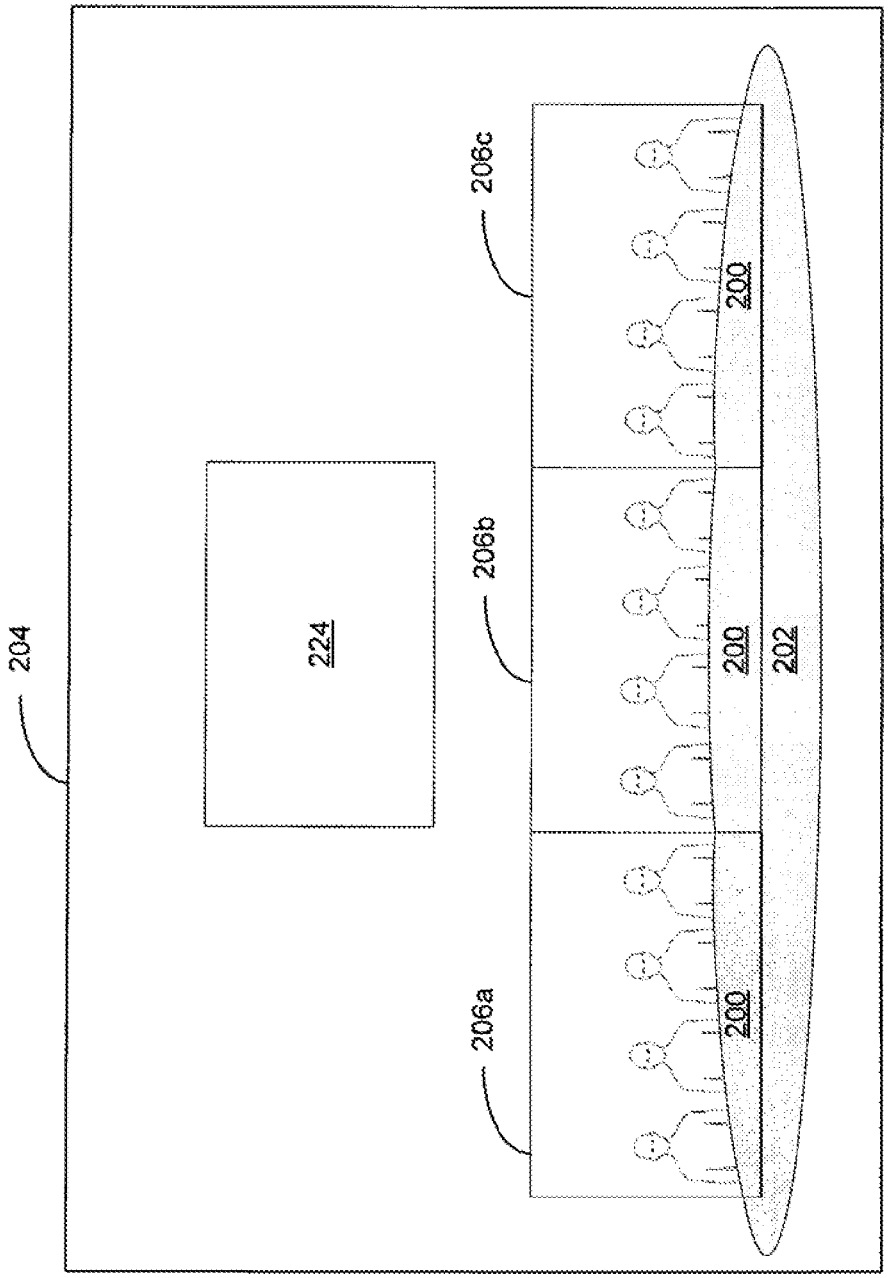
FIGS. 6A-6C depict examples of additional video streams composited onto the background image in accordance with various embodiments.
Figure 6B:
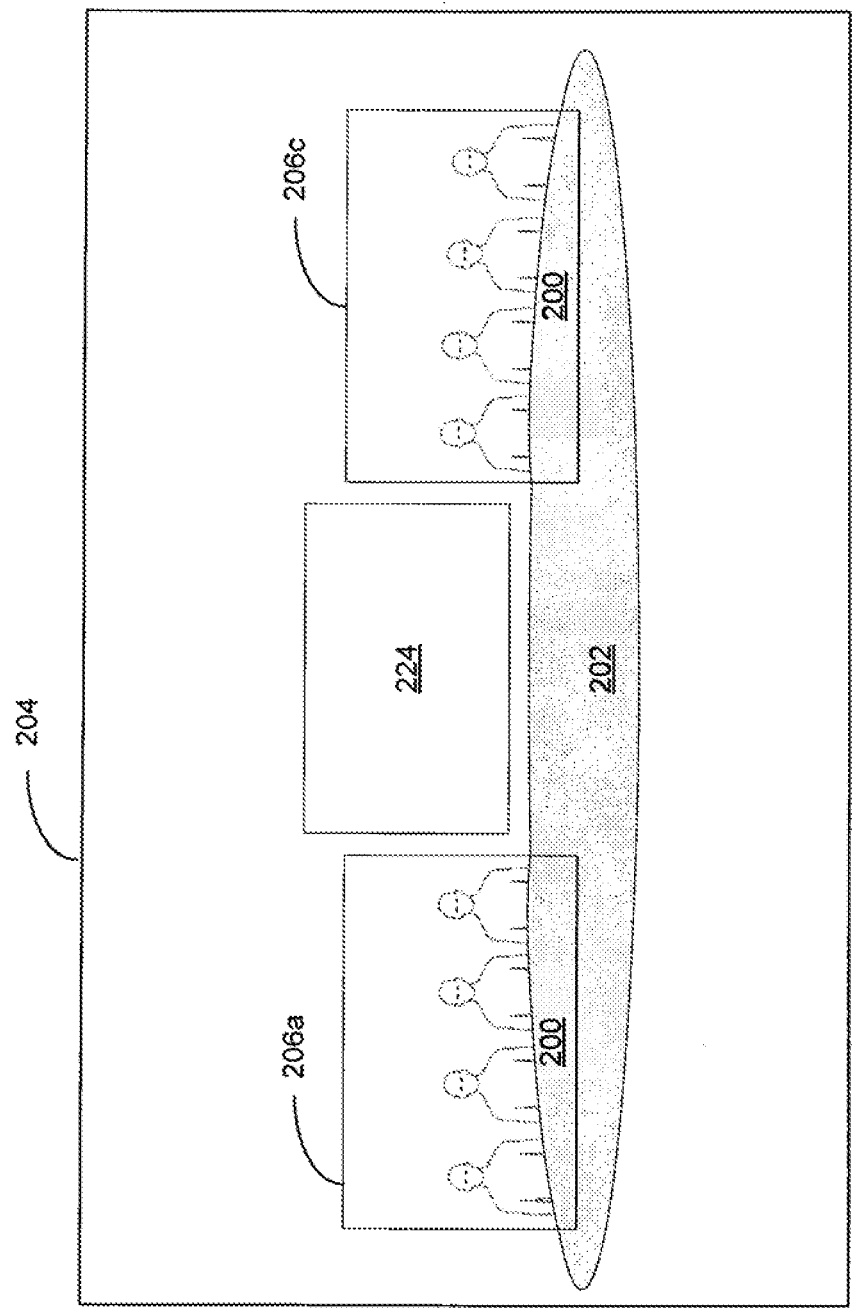
Figure 6C:
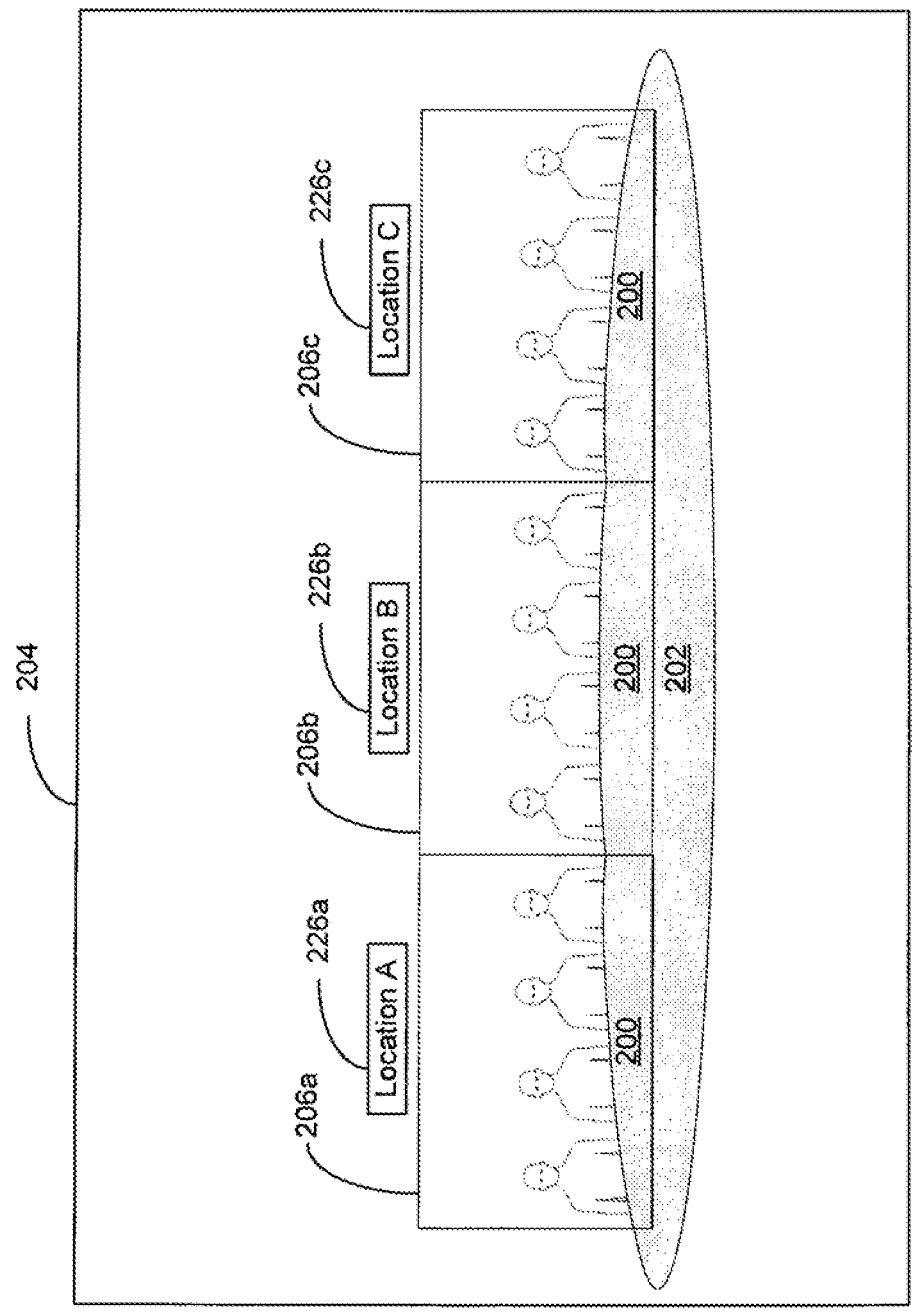

In addition to video streams from the participating endpoints, the composited image may further include the addition of content such as informational elements or identifying information. FIG. 6A depicts one example of a background image 204 including a table image 202, three video streams 206a-206c, and a white board 224, all composited within the single composite image. FIG. 6B depicts another example, where the white board 224 is placed in the same space with the video streams 206 showing remote participants. FIG. 6C depicts an example of identifying information 226a-226c being included in the composite image to identify the originating location corresponding to the video streams 206a-206c, respectively. Alternatively, the identifying information 226a-226c might be used to identify departments, teams or companies participating in the video conference. Other examples of informational elements or identifying information will be apparent to those involved in video conferencing.

Figure 7:
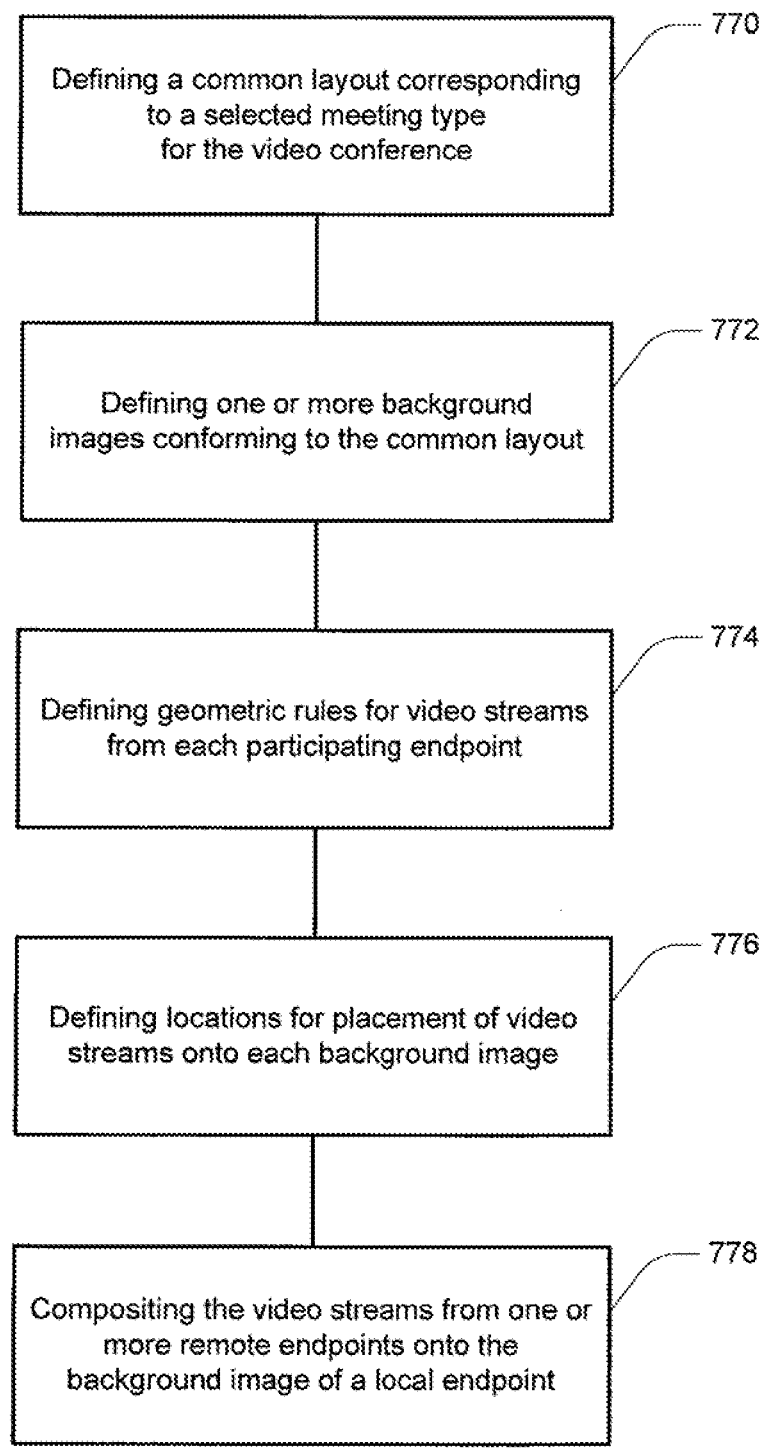
FIG. 7 is a flowchart of a method of video conferencing in accordance with one embodiment.

FIG. 7 is a flowchart of a method of video conferencing in accordance with one embodiment.

At 770, a common layout for a meeting topology is defined for participants of the video conference corresponding to a selected meeting type. The common layout is consistent across each participating endpoint for its location within the meeting topology and defines the geometry of the virtual meeting space. However, as noted above, e.g., with respect to the common layouts of FIGS. 1B and 1C, different endpoints may be different roles within the meeting space.

At 772, one or more background images conforming to the common layout are defined. The background image for each participating endpoint depicts a view of a meeting space of the selected meeting type from a point of view of that participating endpoint. The common layout defines the type of background image to be used for each participating endpoint, generally conforming to the geometry of the common layout. Multiple background images may be available for each common layout as noted above. Similarly, the background image need not be consistent for each endpoint, but is determined by the meeting topology for the global meeting type based on the role each endpoint plays in the global meeting type. For example, in a classroom meeting type, one endpoint acting as the instructor may utilize a different background image than remaining endpoints acting as students, but each conforms to the geometry of the common layout from the perspective of the participant's role in that meeting.

At 774, geometric rules are defined for video streams to be received from the endpoints participating in the video conference. These rules conform to the common layout and the selected background image to permit compositing of the video streams with the background image to facilitate the perception of a virtual meeting space for the type of meeting defined by the common layout. Implementation of the geometric rules for the video streams may be carried out by the source endpoint, e.g., capturing an image having the desired geometry or capturing an image and editing that image to obtain the desired geometry, prior to transmission of that video stream. As noted above, correction may include cropping, matting or other manipulation of the image to obtain the desired geometry. Alternatively, a central management system, or even a receiving endpoint, may correct a received video stream that does not conform to the common layout rules to obtain the desired geometry. For example, the central management system may obtain a video stream from one of the endpoints that is incapable of providing the desired geometry. The central management system may then correct that non-conforming video stream to obtain the desired geometry. This corrected video stream is then provided to one or more other endpoints. In another example, the receiving endpoint may correct that non-conforming video stream before compositing it within the background image.

At 776, locations are defined, for each participating endpoint, within its background image for placement of video streams from the other participating endpoints. These locations are determined by the relative positions of the endpoints within the common layout as well as the geometries of the video streams and the background image.

At 778, video streams from one or more remote endpoints are composited onto the background image of a local endpoint. The video streams having the desired geometries are composited onto the background image such that edges of one or more elements of each video stream align with an edge of a corresponding one or more elements of the background image to facilitate the perception of a single virtual meeting space shared by the participants of each endpoint. In addition, additional images or content may be composited onto the background image, such as informational elements or identifying information.

Figure 8:
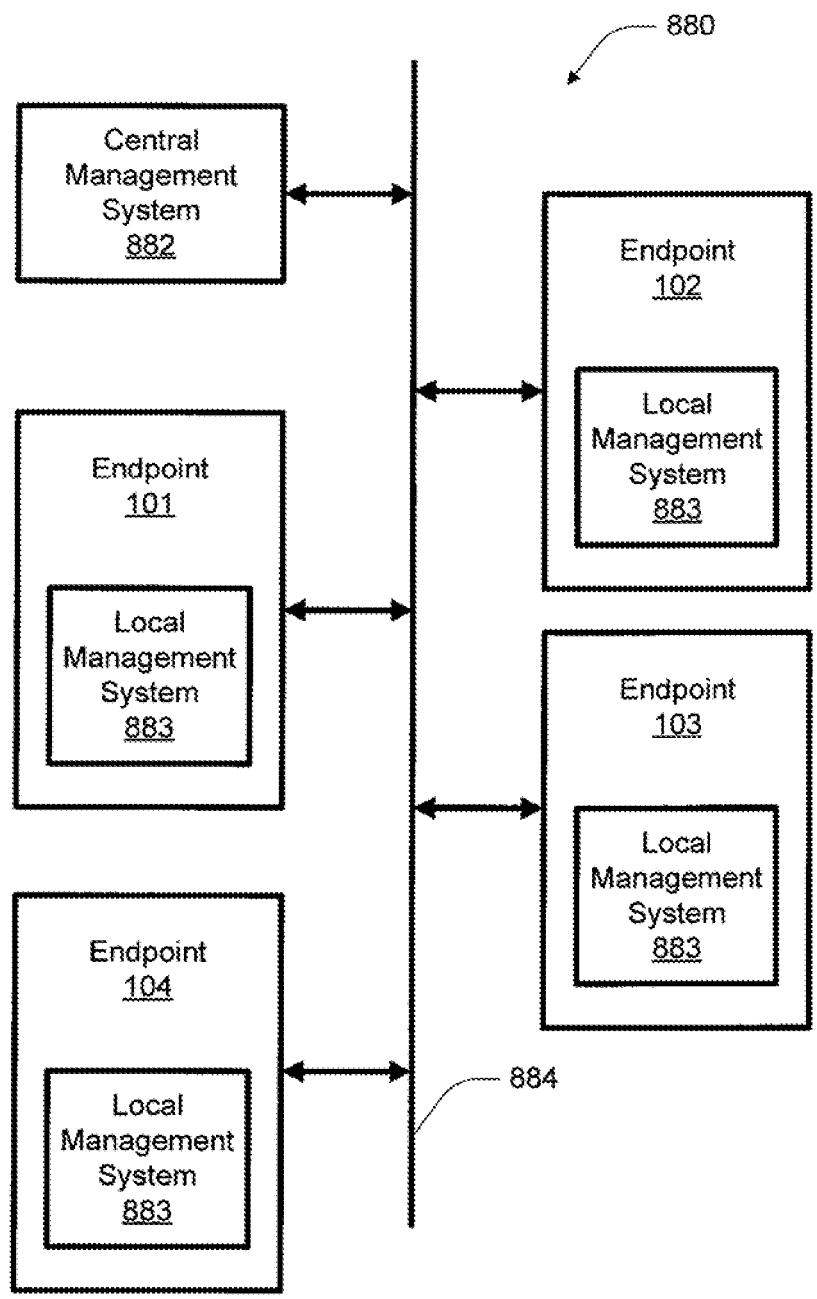
FIG. 8 is a block diagram of a video conferencing system in accordance with one embodiment.

FIG. 8 is a block diagram of a video conferencing system 880 in accordance with one embodiment. The video conferencing system 880 includes one or more endpoints 101-104 for participating in a video conference. The endpoints 101-104 are in communication with a network 884, such as a telephonic network, a local area network (LAN), a wide area network (WAN) or the Internet. Communication may be wired and/or wireless for each of the endpoints 101-104. The video conferencing system 880 is configured to perform methods described herein. The video conferencing system 880 includes a central management system 882, often referred to as a hosting service, and local management systems 883. Each of the endpoints 101-104 includes its own local management system 883. The central management system 882 defines which endpoints are participating in a video conference. This may be accomplished via a central schedule or by processing requests from a local endpoint or by any event management client. The central management system 882 defines a common layout for the event meeting topology and corresponding background images for each local endpoint 101-104 participating in the event. The central management system 882 may further provides stream connection information linking positions in the background image to video stream generators of remote endpoints participating in the event. For source-side com positing, the local management systems 883 composite the various received video streams onto the background image to generate its composite image. Alternatively, the central management system 882 may composite the received video streams onto a background image, and provide each participating endpoint with a composite image corresponding to its view within the common layout.

The local management system 883 may be part of an endpoint, such as a client computer associated with each endpoint, or it may be a separate component, such as a server computer. The central management system 882 acts as a host computer and may be part of an endpoint or separate from all endpoints, e.g., the central management system 882 may be a function of a server computer on the network 884. The local management system 883 may contain a single computer having one or more processors to provide both client and server capabilities.

For instance, a client endpoint may have a local management system 883 operating on a computer system within a virtual meeting. Optionally, the client endpoint may provide a host service for another client endpoint in a virtual collaboration event. The computer includes computer readable memory configured to allow the computer to implement a compositing function for the local layout of the virtual collaboration event. The computer receives information from a host central management system 882 to setup rules for a common layout of multiple video streams received at the computer. A composited image is created by compositing the multiple video streams onto a background that includes an object while keeping at least one of a proper perspective, order, and substantial alignment to the object of the multiple video streams based on the rules of the common layout. The background is a meeting space that fills in gaps between the multiple video streams with appropriate structure of the object. The background helps to create the context of the meeting space for the participants of the virtual collaboration event. The composited image is displayed on a display within the client endpoint or sent to a remote client if the client endpoint is acting as a host service.

The client computer may also request the rules for the common layout from the host for a given meeting type and a given number of participants. If the client computer does not perform the request, it is done by another client computer in the event or other event management client.

The client computer may also mat received video streams to replace or add desired elements so that the video streams meet the rules for the common layout. The client computer may also generate at least one video stream based on the rules of the common layout by using at least one of the techniques of camera positioning, zoom, angle, perspective, field of capture, or aspect ratio. The client computer may also do post-capture editing of the received or generated video streams with matting to replace or add desired elements to allow them to conform to the common layout. In addition, the background of the common layout may contain multiple objects for the video streams to align to. The objects may have at least one edge that is softened or there may be elements of the objects that fade from darker to lighter.

The central management system acts as a host to provide a virtual meeting common layout service for the virtual collaboration event. When doing so, a request from a client is received to organize a unified meeting space event, e.g., an event that takes place in a unified meeting space, based on at least one of an event type, a list of event endpoints, and endpoint capabilities. The host determines the background rules for a background containing an alignment object for each of the one or more of the event endpoints to substantially align video streams to. The determined background rules are sent to each event endpoint as rules for a common layout of the unified meeting space event.

The host may also determine rules for video stream management between the event endpoints or with the host and the endpoints based on the organized unified meeting space. The host may send the determined rules for the video stream alignment as part of the rules for the common layout. The host may also receive video streams from one or more event endpoints to create at least one composited stream based on the rules for the common layout. If the host is acting also as a client endpoint, it may display the composited stream on its local display. If the host is providing a compositing service to another event endpoint it may send the composited stream to that event endpoint for its display at that location.

The host may also receive a video stream from at least one endpoint and mat it the received video stream to replace or add desired elements consistent with the rules for the common layout. The host may then send the matted video stream to another event endpoint for display.

The background may contain multiple objects to align the video streams to. The alignment objects may have one or more edges that are softened and/or other elements that fade from darker to lighter.

The central management system may be configured to act as a host with an application programming interface (API) to provide the various functions required to setup and configure the unified meeting space for the event by communicating over a network to client endpoints and possibly other event management clients. The API is configured to receive requests from the client and to provide responses to the requests back to the respective client. The requests from the clients can cause the host to perform one or more of the following actions:
  a. Define a common layout for two or more endpoints in communication with the network and participating in a video conference, wherein the common layout corresponds to a selected meeting type that defines a meeting topology with consistent geometry and relative positioning of the two or more endpoints;
  b. define one or more background images conforming to the common layout, wherein a background image for each participating endpoint depicts a view of a meeting space of the selected meeting type from a point of view of that participating endpoint;
  c. define geometric rules for video streams to be received from the two or more endpoints, wherein the geometric rules conform to the common layout; and
  d. define for each participating endpoint relative locations within a respective background image for placement of video streams from one or more of the other participating endpoints, wherein the relative locations within a background image for placement of video streams comprises defining locations such that edges of at least one element of each of the video streams is placed to align with an edge of at least one corresponding element of that background image.

Additionally, the host API may be configured to edit video streams for participating endpoints that do not conform to the geometric rules. Also, the API may be configured to composite video streams from one or more of the endpoints onto a background image conforming to the common layout. The API can also be configured to define one or more background images to have softened edges of one or more elements or to have one or more elements that fade from darker to lighter.

The various embodiments described have advantages over other existing solutions. Source-side compositing can be used to correct image size and content before transmitting a video stream. This makes is easy for the receiving endpoints to arrange the source-side composited video streams into a final composited panoramic multipoint image on an appropriate background image.

Receive-side compositing at an endpoint allows streams of many sizes to be arranged against a background that improves the sense of environment and connectedness. Coordination of these compositing operations via central management allows all participants in the meeting to have consistent views and arrangements which better simulates a common meeting environment.

As such, there may be at least two compositing levels:
  1. Creation of a video stream representing an individual endpoint. Information for the video stream comes only from that site.
  2. Combination of streams from multiple sites onto an event background.

In one embodiment, one can do (1) above at the source-side combining multiple video streams with a local background image. This type 1 compositing is used to "correct" an image for size mismatch with that required by the event. The advantage for doing type 1 compositing at the host or at a service provided by a host is that video streams can be adjusted to suit receive clients endpoints that are unable to process the video streams themselves to meet the common layout. For example, some conventional video conferencing terminals or rooms are not currently able to crop or resize images. Therefore, one endpoint may need to create a valid video stream for display directly to a non-compliant common layout endpoint's display.

In one embodiment, the type (2) compositing is done at the client endpoint side. Streams from multiple endpoints are received by each client endpoint. Each client endpoint then composites these streams into a common layout defined for the event. The arrangement of the common layout and type of background is coordinated with the meeting central management system where ever that is on the network.

There are different levels of operations for the event endpoints to implement or request a host service to provide that can be defined for video streams which all need information (common layout rules) about the common layout event.

For Individual video stream operations, the event endpoint or host can operate on video streams to meet the common layout rules by:
  a) Camera configuration: Capture original live video stream from local host. Correct stream generation configuration (magnification (zoom), bandwidth, view, etc) for the camera is selected based on common layout meeting configuration information in the rules supplied by host.
  b) Non-Camera configuration: operation on live image: Video stream correction to correct magnification and resolution.
    a. Can include any adjustment to video image such as selection of a sub-region or scaling. The key here is that this operation is performed to achieve a specified stream geometry based on the host/central configuration common layout rules.
  c) Non-Camera configuration: Compositing of stream with background or sub-background (portion of background) to create the proper size, resolution, magnification and background type to meet the common layout rules.

For Multiple stream operations, the event endpoint or host can operate on video streams to meet the common layout rules by:

d) Collection of correct original streams from various endpoints on the network. Select from multiple available video streams based on the common layout rules.

e) Selection of proper meeting arrangement and background based on the common layout rules.

f) Layout and alignment of video streams into windows on the common layout meeting background and compositing according to the common layout rules.

These operations can occur at a source (host) or a receive (client) endpoint or at some process on a computer acting as a host service. Generally, there is an ordering to the operation where they generally flow from a) to f) as noted above.

In one embodiment, host and clients are coordinated to allocate the operations a)-f) above. For instance, in one embodiment a video conference endpoint largely performs a-c at the host and d-f at the client. In another embodiment all steps are performed in one host or client: In another embodiment, operations a)-d) are done on an endpoint client and operations e)-f) are done based on common layout rules from the central management server. Operations b)-c) can be performed at a host service or endpoint client. For example, an older video telepresence conferencing endpoint may only be able to supply non-compliant video streams according to the common layout rules. The host service or client can repair the streams in operations b) and c) prior to operations d)-f).

What is claimed is:

1. A computer for a virtual meeting having computer readable memory configured to allow the computer to perform steps, comprising:
   receiving information from a host to setup rules for a common layout of multiple video streams received at the computer;
   creating a composited image by compositing the multiple video streams onto a background having an object while keeping at least one of a proper perspective, order, and substantial alignment to the object of the multiple video streams, based on the rules of the common layout, wherein the background is a meeting space that fills in gaps between the multiple video streams with appropriate structure of the object and which the background creates the context of the meeting space; and
   displaying the composited image on a display.

2. The computer of claim 1, wherein the computer readable memory is further configured to cause the computer to perform the step of requesting the rules for the common layout from the host for a given meeting type and a given number of participants.

3. The computer of claim 2, wherein the computer readable memory is further configured to cause the computer to perform at least one of the step of matting to replace desired elements and matting to add desired elements onto video streams that do not meet the rules for the common layout.

4. The computer of claim 1, wherein the computer readable memory is further configured to cause the computer to perform the step of generating at least one video stream based on the rules for the common layout using at least one of camera positioning, zoom, angle, perspective, field of capture, and/or aspect ratio.

5. The computer of claim 1, wherein the computer readable memory is further configured to cause the computer to perform at least one of the steps of post-capture editing, matting to replace desired elements, and matting to add desired elements to at least one of the received multiple video streams and at least one generated video stream to conform to rules for the common layout.

6. The computer of claim 1, wherein the background contains multiple objects for the multiple video streams to align to.

7. The computer of claim 6, wherein the objects have at least one of edges that are softened and elements that fade from darker to lighter.

8. A method for providing a virtual meeting common layout service, comprising:
   receiving a request from a client to organize a unified meeting space event based on at least one of an event type, a list of event endpoints, and endpoint capabilities;
   determining background rules for a background containing an alignment object for each of the one or more of the event endpoints to substantially align video streams to; and
   sending the determined background rules to each event endpoint as rules for a common layout of the unified meeting space event.

9. The method of claim 8, further comprising determining rules for video stream management between the event endpoints and/or a host based on the organized unified meeting space and sending the determined rules for video stream alignment as part of the rules for the common layout.

10. The method of claim 8, further comprising receiving video streams from one or more event endpoints and creating at least one composited stream based on the rules for the common layout.

11. The method of claim 10, further comprising sending the composited stream to another event endpoint for display.

12. The method of claim 8, further comprising receiving a video stream from at least one event endpoint and matting it to at least one of replace desired elements and add desired elements consistent with the rules for the common layout.

13. The method of claim 12, further comprising sending the matted video stream to another event endpoint for display.

14. The method of claim 8, wherein the background contains multiple objects to align the video streams to.

15. The method of claim 9, wherein the alignment object has at least one of edges that are softened and elements that fade from darker to lighter.

16. A hosting server for video conferencing, comprising:
   a server computer for communication with a network configured to receive requests from clients and to provide responses to the clients, the requests causing the server to perform one or more of the following steps, comprising:
      defining a common layout for two or more endpoints in communication with the network and participating in a video conference, wherein the common layout corresponds to a selected meeting type that defines a meeting topology with consistent geometry and relative positioning of the two or more endpoints;
      defining one or more background images conforming to the common layout, wherein a background image for each participating endpoint depicts a view of a meeting space of the selected meeting type from a point of view of that participating endpoint;
      defining geometric rules for video streams to be received from the two or more endpoints, wherein the geometric rules conform to the common layout; and
      defining for each participating endpoint relative locations within a respective background image for placement of video streams from one or more of the other participating endpoints, wherein the relative locations within a background image for placement of video streams comprises defining locations such that edges of at least one element of each of the video streams is placed to align with an edge of at least one corresponding element of that background image; and
wherein the server computer returns the defined results of the request to the respective client.

17. The hosting server of claim 16, further comprising:
wherein the server is configured to provide for editing video streams for participating endpoints that do not conform to the geometric rules.

18. The hosting server of claim 16, wherein the requests further cause the server to perform the step:
compositing video streams from one or more of the endpoints onto a background image conforming to the common layout.

19. The hosting server of claim 16, wherein defining one or more background images comprises defining one or more background images having softened edges of one or more elements of the background images.

20. The hosting server of claim 16, wherein defining one or more background images comprises defining one or more background images having one or more elements of the background images that fade from darker to lighter.

* * * * *